United States Patent
Minor et al.

[11] Patent Number: 5,957,331
[45] Date of Patent: Sep. 28, 1999

[54] SYSTEM FOR FILLING CONTAINERS WITH BULK MATERIAL

[75] Inventors: Horst Minor, Neukirchen-Vluyn, Germany; Bogdan A. Galas, Randburg, South Africa

[73] Assignee: Krupp Fordertechnik GmbH, Essen, Germany

[21] Appl. No.: 08/850,417

[22] Filed: May 2, 1997

[51] Int. Cl.⁶ .................................................. B65G 67/02
[52] U.S. Cl. .............................. 222/56; 222/58; 222/64; 222/1; 141/196
[58] Field of Search ................................ 222/1, 56, 58, 222/64, 65; 141/196

[56] References Cited

U.S. PATENT DOCUMENTS

| | | | |
|---|---|---|---|
| 3,252,618 | 5/1966 | Anderson et al. | 222/1 |
| 4,092,721 | 5/1978 | Rueff et al. | 141/196 |
| 4,582,097 | 4/1986 | Izzi et al. | 222/1 |
| 4,629,392 | 12/1986 | Campbell et al. | 222/56 |
| 5,423,455 | 6/1995 | Ricciardi et al. | 222/1 |

FOREIGN PATENT DOCUMENTS

| | | |
|---|---|---|
| 78 04 930 U1 | 9/1978 | Germany . |
| 35 33 070 A1 | 3/1987 | Germany . |
| 38 02 259 A1 | 8/1989 | Germany . |
| 37 25 332 C2 | 12/1990 | Germany . |
| 39 26 689 C2 | 5/1991 | Germany . |
| 41 35 329 A1 | 4/1993 | Germany . |
| 44 25 751 A1 | 1/1996 | Germany . |

*Primary Examiner*—J. Casimer Jacyna
*Attorney, Agent, or Firm*—Herbert Dubno; Andrew Wilford

[57] ABSTRACT

A container, normally a vehicle such as a hopper car or truck, capable of holding a predetermined maximum weight and a predetermined maximum volume with a bulk material is filled by feeding a batch of the material from a supply to a bin, weighing the batch in the bin, and then feeding the batch from the bin to the container. The volume of the material in the bin is measured the feed of the material is controlled in accordance with the measured volume.

7 Claims, 3 Drawing Sheets

SYSTEM FOR FILLING CONTAINERS WITH BULK MATERIAL

FIELD OF THE INVENTION

The present invention relates to a system for filling a container with bulk material. More particularly this invention concerns a method of and apparatus for filling hopper cars, trucks, or the like.

BACKGROUND OF THE INVENTION

It is standard to transport bulk materials such as grain, coal, or ore in containers that can be vehicles such as train hopper cars, barges, or bulk-carrier trucks. To transport the material as efficiently as possible it is obviously necessary to fill the containers to their maximum capacity.

This is typically done by means of a system comprising a supply of the bulk material and a batch-weigh bin for receiving the material from the supply, weighing the received material, and depositing the received material into the container. The supply is typically a very large bin filled with the material and having on its floor a closable outlet. The batch-weigh bin sits below the supply bin and above the container to be filled and it also has an outlet provided with a door or shutter. The batch-weigh bin is mounted on strain gauges or a weigh beam so that the weight of the material deposited in it can be determined accurately.

Under ideal circumstances the density of the material is known so that it is possible to calculate the weight that will fill the containers to the desired volume. When working with a relatively dense material such as ore, it is therefore possible to load the container with all the weight it can hold without there being any likelihood that too much material is put in, that is that the container is made to overflow.

With a lighter bulk material such as grain, however, or even with a material whose density varies as for instance occurs with outside storage when some of the material is wet, it is necessary to put into the container less weight than it can hold so as not to overflow the container. This is normally done calculating the maximum weight based on the predetermined volume the container can hold and the density of the material being charged into the container, since the bin is set up to measure weight so that any measurement must be converted into a weight measure. The problem with this method is that, to be safe, it is necessary to use the minimum possible density of the bulk material. Hence the containers are in general filled somewhat below their capacity which is a waste of shipping space.

OBJECTS OF THE INVENTION

It is therefore an object of the present invention to provide an improved system for filling containers with bulk material.

Another object is the provision of such an improved system for filling containers with bulk material which overcomes the above-given disadvantages, that is which can completely fill containers with material of different densities, even when the density of the material in the supply varies somewhat.

SUMMARY OF THE INVENTION

A container, normally a vehicle such as a hopper car or truck, capable of holding a predetermined maximum weight and a predetermined maximum volume with a bulk material is filled by feeding a batch of the material from a supply to a bin, weighing the batch in the bin, and then feeding the batch from the bin to the container. According to the invention the volume of the material in the bin is measured and the feed of the material is controlled in accordance with the measured volume.

Thus the actual volume of the material in the bin is determined to ensure that the container is not overfilled. This can be done according to the invention by controlling the feed from the bin to the container in accordance with the measured volume. In accordance with the invention the material is fed from the supply to the container only until the batch in the bin has the predetermined weight and then an amount of the material is fed from the bin to the container that has the predetermined volume, leaving behind in the bin any extra material. Alternately the material is fed from the supply to the container until the batch has the predetermined volume and then an amount of the material fed from the bin to the container that has at most the predetermined weight, once again leaving any extra material behind in the bin. Both these procedures therefore use one of the parameters to control filling of the bin and the other of the parameters to control filling of the container from the bin, ensuring that the amount of the material in the container will not exceed either of the parameters.

In accordance with a different procedure according to the invention the feed from the supply to the bin is controlled in accordance with the measured volume. This can most simply be done, when it is known that the material is so light that the maximum volume will not be exceeded, by continuously monitoring the volume in the bin and stopping feed into it when the volume in the bin is equal to the maximum container volume.

A particularly effective procedure according to the invention entails first feeding from the supply into the bin only an amount of the material considerably smaller than the predetermined maximum weight, then measuring the volume of and weighing the considerably smaller amount of the material in the bin, and finally, based on the ratio of the weight to volume of the considerably smaller amount, calculating the weight of the material that would have the predetermined maximum volume. Thereafter feed from the supply into the bin is recommended until the weight of the material in the bin corresponds to the calculated weight and subsequently feeding all of the material in the bin into the container. With this method, therefore a small sample batch of 5% to 50%, preferably 10%, of the capacity of the container is dumped from the supply into the bin and from it the density of the material is calculated. Based on this density it is easy to determine how much a given volume, in this case the maximum container volume, will weigh, and thereafter the supply is opened up again while monitoring the weight of the bin until the bin holds an amount of material whose weight corresponds to the weight that, with the calculated density, produces the desired container volume.

With the method of this invention it therefore is possible to fill the containers to the very limit. If the material is quite dense, the maximum weight is filled into the container and the container will be only partially filled. If the material is light, the container is filled to the very edge with the maximum volume it can contain. Either way the container is loaded to its maximum.

According to the invention the volume of the material is measured by measuring the height of an upper surface of the material in the bin. More specifically the volume of the material is measured by measuring the height of an upper surface of the material in the bin at two horizontally offset locations, calculating an angle the upper surface forms with the horizontal based on the height of the upper surface at the locations, and determining the volume of the material in the bin from a known shape of an inner surface of the bin, the angle of the upper surface of the material, and the height of the upper surface of the material. The beams are directed downward from respective fixed positions above the upper surface. Thus the angle of repose of the material is determined so that the height and shape of the top surface of the mass of material in the bin is known, and of course the shape of the bin is known so that it is a simple matter to calculate the volume of this trapped mass.

The apparatus according to the invention has according to the invention a supply of the material, a bin adjacent the supply, feed means on the supply for feeding the material from the supply into the bin, feed means on the bin for feeding the material from the bin into the container, and a scale connected to the bin for weighing material in the bin and producing a weight output corresponding thereto. Sensors connected to the bin measure a volume of material in the bin and produce a volume output corresponding thereto. A controller is connected to the scale, volume sensors, and both feed means for controlling the feed of the material in accordance with the both of the outputs. This controller calculates a density of the material in the bin from the weight and volume outputs. It does this by measuring a height of an upper surface of the material in the bin.

More specifically according to the invention the sensors are provided at fixed locations above the upper surface directing respective sensing beams downward at the material in the bin. They can be laser-beam or ultrasonic-beam sensors. The material forms in the bin a heap having a peak and the locations are spaced apart on a line extending straight from the peak. When the container is a vehicle the apparatus has means for moving a succession of vehicles step-wise underneath past the bin.

The system of this invention can be used with dry or wet bulk materials. It can even be adapted fairly easily to use with liquids so that it takes into account liquids of varying density.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
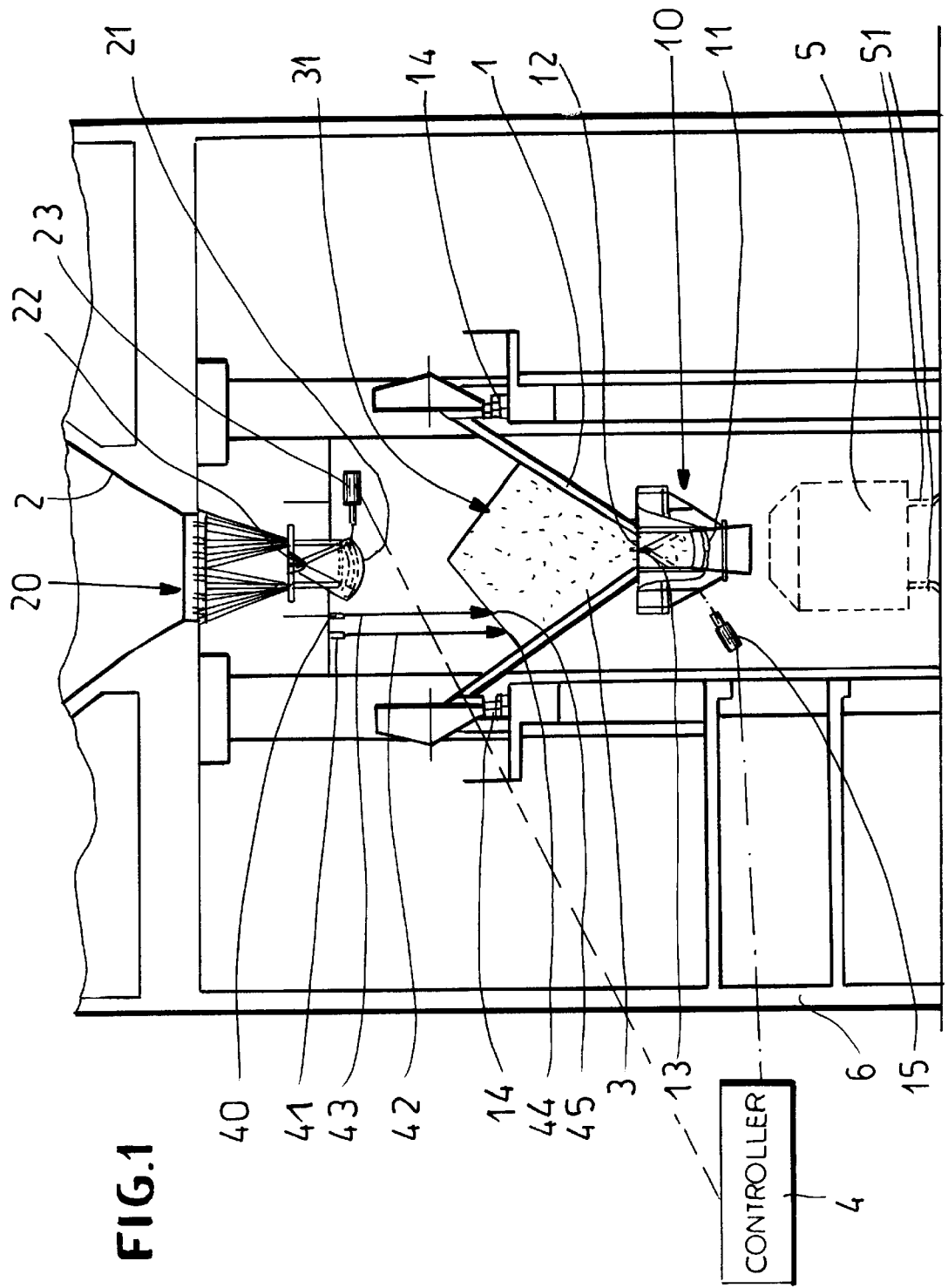
FIG. 1 is a largely schematic view of the apparatus for carrying out the method of this invention.

As seen in FIG. 1 a system for filling containers, here rail hopper cars 5 riding on rails 51, basically comprises a bulk-material supply 2 and, between it and the car 5, a batch-weigh bin 1. A belt conveyor such as described in German 3,411,540 of Bodo or 4,230,626 of Lenzner can be used between the bin 1 and the car 5.

The bulk-material supply 2 has a hopper-type lower end or outlet 20 provided with a shutter 21 that can pivot about a horizontal axis 22. This supply 2 has a horizontal length measured perpendicular to the view plane of FIG. 1 which is about four times its horizontal width measured perpendicular thereto and contains a very large quantity of the bulk material to be filled into the cars 5. An actuator shown schematically at 23 operates the shutter 21

The batch-weigh bin 1 has a hopper-type lower end 10 forming a downwardly open outlet 12 that can be closed by a shutter or door 11 pivotal about an axis 13 and operated by another schematically shown actuator 15. The bin 1 is supported on four strain-gauges or weighing cells 14 that are connected to a computer-type controller 4 that is also connected to the actuators 15 and 23.

Figure 2:
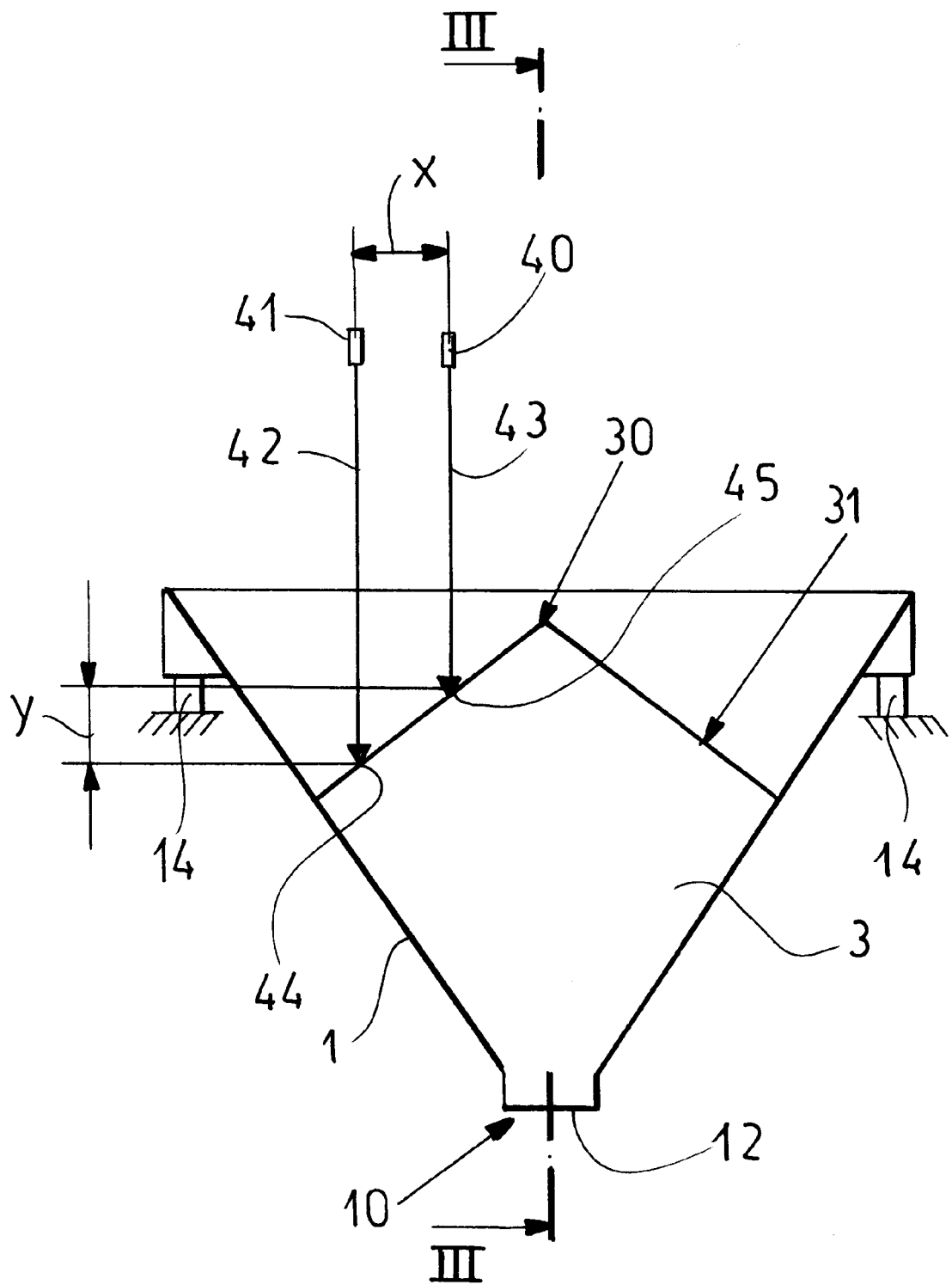
FIG. 2 is a large-scale schematic view of a detail of FIG. 1.
Figure 3:
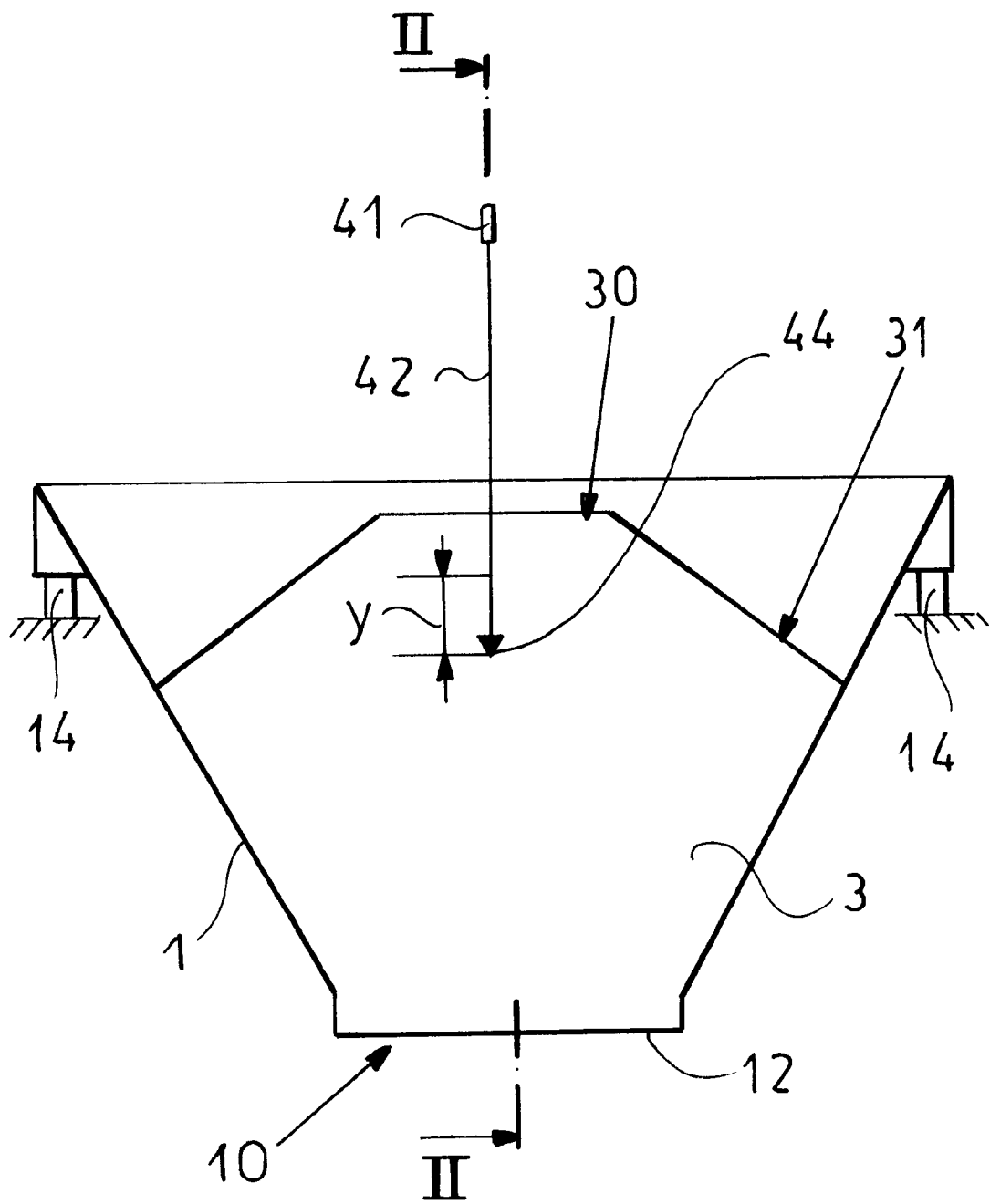
FIG. 3 is a section taken along line III—III of FIG. 2, line II—II of FIG. 3 indicating the section plane of FIG. 2.

Thus it is possible for the supply 2, under the control of the controller 4, to deposit in the bin 1 a heap 3 of the bulk material having an upper surface 31 and a peak or summit 30 (FIGS. 2 and 3) forming a line extending perpendicular to the view plane of FIG. 1 and parallel to the view plane of FIG. 3. In turn the bin 1 can by opening the door 11 deposit its contents in the car 5.

A pair of laser or ultrasonic distance sensors 40 and 41 are mounted on a frame 6 of the system above the bin 1. They generate beams 42 and 43 that strike the upper surface 31 of the heap 3 at locations 44 and 45 that are offset horizontally by a distance x and, because of the inherent repose angle of the heap 3, vertically by a distance y. The horizontal offset x between the locations 44 and 45 is perpendicular to the londitudinal direction of the peak 30. These sensors 40 and 41 are connected to the controller 4 which also has in its memory information regarding the volumetric capacity of the bin 1. It is therefore no problem for this controller 4 to calculate, based on the lengths of the beams 42 and 43, the repose angle of the heap 3 and the volume of the bulk material in the bin 1. The outputs of the gauges 14 are also fed to this controller 4 so that it also knows the weight of the bulk material in the heap 3, making it once again no problem to calculate the average density (mass/volume) of the heap 3, e.g. in $kg/m^3$ This system can be operated according to the instant invention in different manners:

First method

In accordance with the first method a small amount, for example 5 t, of the bulk material is dumped by the supply 2 into the bin 1, in a situation where the car 5 has a maximum rating of 58 t. The bin 1 can confirm this weight and the sensors 40 and 41 can calculate the volume of this trial amount.

The controller 4, whose memory holds the maximum load rating for the car 5 both with respect to weight (here 58 t) and volume, can therefore calculate the weight of an amount of bulk material necessary to completely fill the car 5 and, providing this amount does not exceed the maximum weight the car 5 can hold, it opens the outlet shutter 21 to deposit more bulk material into the bin 1 until the heap 3 has the desired weight. If it determines that the maximum load rating of the car 5 can be reached without exceeding its maximum volume rating, it adds 53 t of bulk material to the bin 1.

The advantage of this system which calculates the maximum weight that can be added based on the weight of a given smaller volume, is that it eliminates the need to monitor the volume of the heap 3 as it is being formed. Due to the generation of dust during filling of the bin 1 the sensors 40 and 41 can have difficulty getting accurate readings.

Second method

In accordance with the second method a small amount of the bulk material is dumped into the supply 2 as in the first method and its volume and weight are determined so that the controller 4 can calculate the average density of the bulk material. Based on this density and the known maximum volume of the car 5, the controller 4 can determine the weight of the bulk material necessary to completely fill the car 5. An amount of material equal to this weight minus the weight already in the bin 1 is transferred from the supply 2 to the bin 1 and the entire contents of the bin 1 are dumped in to the car 5. The calculated density can be used to calculate the weight to be loaded into succeeding cars without having to weigh and measure the volume of a sample. This method is usable when it is possible that the material density has changed after sitting some time.

Third method

The third method basically corresponds to the second method except that here several cars 5 of the same volume are filled. This eliminates the need to make calculations for each car; instead the density and load-weight calculations are made once and then loading is identical for succeeding cars.

Fourth method

In a last and extremely simple method, the computer controller 4 monitors the volume and the weight of the heap 3 and compares it to the maximum volumetric and weight capacity of the car 5 to be filled. When 95% of either of these capacities is reached, the supply 2 is closed or set to dribble to supply the last 5%. The heap 3 is then transferred to the car 5.

The first method described above is usable when the density of the bulk material varies considerably. This can happen when, for instance, the material has wet spots that are quite a bit heavier than dry spots. The second method usable when the density varies less, and the third method when the bulk material can be counted on to have fairly constant density. The fourth method is the safest in that it takes even drastic variations of the material density into account. All these methods can easily be carried out by the same equipment.

We claim:

1. A method of filling a container capable of holding a predetermined maximum weight and a predetermined maximum volume with a bulk material, the method comprising the steps of sequentially:

feeding from a supply into a bin only an amount of the material having a weight considerably smaller than the predetermined maximum weight;

measuring the volume of and weighing the considerably smaller amount of the material in the bin;

based on the ratio of the weight to volume of the considerably smaller amount, calculating the weight of the material that would have the predetermined maximum volume;

thereafter recommencing feed from the supply into the bin until the weight of the material in the bin corresponds to the lesser of the calculated weight and the predetermined maximum weight; and feeding all of the material in the bin into the container.

2. The container-filling method defined in claim 1 wherein the volume of the material is measured by measuring the height of an upper surface of the material in the bin.

3. The container-filling method defined in claim 1 wherein the volume of the material is measured by measuring the height of an upper surface of the material in the bin at two horizontally offset locations, calculating an angle the upper surface forms with the horizontal based on the height of the upper surface at the locations, and determining the volume of the material in the bin from a known shape of an inner surface of the bin, the angle of the upper surface of the material, and the height of the upper surface of the material.

4. The container-filling method defined in claim 3 wherein the height of the upper surface at the two locations is measured by directing measuring beams downward from respective fixed positions above the upper surface.

5. The container-filling method defined in claim 1 wherein the container is a vehicle.

6. The container-filling method defined in claim 1 wherein the considerably smaller amount is equal to at most 50% of the maximum weight.

7. The container-filling method defined in claim 6 wherein the considerably smaller amount is equal to at most 10% of the maximum weight.

* * * * *